(12) United States Patent
Mathauer et al.

(10) Patent No.: US 7,767,125 B2
(45) Date of Patent: Aug. 3, 2010

(54) METHOD FOR PRODUCING POLYMER BLENDS SUITED FOR USE AS FILTERS

(75) Inventors: Klemens Mathauer, Heidelberg (DE); Marianna Pierobon, Ludwigshafen (DE); Tobias Petsch, Mörschied (DE); Simone Schillo, Ludwigshafen (DE); Michael Kerber, Weinheim (DE); Frank Müller, Ludwigshafen (DE)

(73) Assignee: BASF Aktiengesellschaft (DE)

( * ) Notice: Subject to any disclaimer, the term of this patent is extended or adjusted under 35 U.S.C. 154(b) by 63 days.

(21) Appl. No.: 11/908,633

(22) PCT Filed: Mar. 14, 2006

(86) PCT No.: PCT/EP2006/060702

§ 371 (c)(1),
(2), (4) Date: Sep. 14, 2007

(87) PCT Pub. No.: WO2006/097469

PCT Pub. Date: Sep. 21, 2006

(65) Prior Publication Data

US 2008/0146741 A1    Jun. 19, 2008

(30) Foreign Application Priority Data

Mar. 16, 2005 (DE) .................. 10 2005 012 483

(51) Int. Cl.
*D01F 1/02* (2006.01)
*B01D 37/02* (2006.01)

(52) U.S. Cl. .............. 264/211; 264/142; 264/143; 210/777; 210/193

(58) Field of Classification Search .............. None
See application file for complete search history.

(56) References Cited

U.S. PATENT DOCUMENTS

| 4,344,846 A | 8/1982 | Klein |
| 5,262,053 A | 11/1993 | Meier |
| 2004/0094486 A1 | 5/2004 | Drohmann et al. |
| 2008/0146741 A1* | 6/2008 | Mathauer et al. ............ 525/198 |

FOREIGN PATENT DOCUMENTS

| EP | 0351363 | | 1/1990 |
| EP | 1325777 | A1 | 7/2003 |
| WO | WO-02/32544 | A1 | 4/2002 |

* cited by examiner

*Primary Examiner*—Robert James Popovics
(74) *Attorney, Agent, or Firm*—Connolly Bove Lodge & Hutz LLP

(57) ABSTRACT

Process for production of polymer blends which are suitable as filter aids and are composed of polystyrene and of crosslinked water-insoluble polyvinylpyrrolidones via processing of the two components in an extruder, which comprises melting polystyrene in an extruder and then treating it with the polyvinylpyrrolidone, and adding, to the mixture of the components, from 0.1 to 10% by weight of water, based on the total amount of polystyrene and popcorn polymer, and extruding and comminuting the mixture.

24 Claims, No Drawings

METHOD FOR PRODUCING POLYMER BLENDS SUITED FOR USE AS FILTERS

RELATED APPLICATIONS

This application is a national stage application (under 35 U.S.C. 371) of PCT/EP2006/060702 filed Mar. 14, 2006, which claims benefit of German application 10 2005 012 483.6 filed Mar. 16, 2005.

The present invention relates to an improved process for production of polymer blends based on polystyrene and on popcorn polymers via processing of the components in an extruder, and also to the use of these compositions as filter aids.

An important step of many industrial production processes is the separation of solid/liquid substance mixtures by way of filtration. The term filter aids is used for a number of products employed in the form of free-flowing solids, powders, granules, or fibers in the filtration process.

Filter aids can be applied to the filter in the form of a filter aid layer (precoat filter) prior to starting the filtration process, in order to achieve a looser cake structure, or can be added continuously to the slurry to be filtered.

The term filtration is understood to mean flow of a suspension (slurry), composed of a discontinuous phase (dispersed substances) and of a continuous phase (dispersion medium) through a porous filter. Solid particles are deposited here on the filter material, and the clear filtered liquid (filtrate) is discharged from the filter material. A pressure difference applied during this process acts as external force to overcome the resistance to flow.

Fundamentally different mechanisms of solids isolation can be observed during the filtration procedure. The main systems used here are surface filtration or cake filtration, layer filtration, and sieve filtration. A combination of at least two procedures is often encountered.

In the case of surface filtration or cake filtration, various types of precoat filters are used for drinks filtration.

In all of the precoat filter systems, the solids comprised in the liquid to be filtered, and also the solids intentionally added (filter aids) are retained via a filter medium, whereupon a filter cake forms. Flow through this still occur, as well as through the filter material, during the course of the filtration process. This type of filtration is also termed precoat filtration.

The liquids to be filtered according to the invention are drinks, in particular fruit juices, or fermented drinks, such as wine or beer. In particular, the filter aid obtained by the inventive process is used for filtration of beer. However, the filter aids may, for example, also be used for treatment of tea products, of sparkling wines, or generally for adsorption of undesired ingredients from foods and from other consumable items.

U.S. Pat. No. 4,344,846 describes a method for precoat filtration with filter aids based on expanded polystyrene.

EP 351 363 describes highly crosslinked polyvinylpyrrolidones as stabilizers and filter aids.

WO 02/32544 discloses filter aids based on polystyrene. Preparation can take place via compounding of the polystyrene in the presence of another component in an extruder. Another component which can be used, alongside a wide variety of inorganic compounds, such as silicates, carbonates, oxides, and the like, is polymers, such as crosslinked polyvinylpyrrolidone.

However, it has been found that products thus obtained can give problems during grinding. For example, grinding is possible only with increased energy cost and is therefore not cost-effective on an industrial scale.

It was an object of the present invention to find an improved process for production of filter aids based on polystyrene, also comprising crosslinked polyvinylpyrrolidone, which gives improved grindability, without any averse effect on the morphology possessed by the compounded material and so important for filter action.

Accordingly, a process has been found for production of a blend which is suitable as a filter aid and is composed of polystyrene and of a crosslinked water-insoluble polyvinylpyrrolidone via processing of the components in an extruder, which comprises melting polystyrene in an extruder and then treating it with the polyvinylpyrrolidone and adding, to the mixture of the components, from 0.1 to 10% by weight, preferably from 0.5 to 5% by weight, of water, based on the total amount of polystyrene and of crosslinked polyvinylpyrrolidone, and extruding and palletizing the mixture.

Polymer blends are mixtures of chemically different polymers. In the case of the present invention, the blends are composed of a thermoplastic polystyrene component and of a non-thermoplastic water-insoluble crosslinked polyvinylpyrrolidone popcorn polymer, and the blends here cannot be broken down by physical methods to give the individual components.

Any of the familiar polystyrene grades may be used as polystyrene component, examples being standard polystyrene, impact-modified polystyrene (SB grades), such as copolymers composed of styrene and butadiene, or high-impact-modified polystyrene (HIPS grades), for example polystyrene modified with polybutadiene rubber or modified with styrene-butadiene rubber. These polystyrenes are available commercially, for example in the form of PS 158 k, PS 486 M or Styrolux® (BASF)

According to the invention, the blends comprise, as second polymer component alongside the polystyrene component, water-insoluble crosslinked polyvinylpyrrolidone polymers which do not form gels on absorption of water and which in the literature are also termed "popcorn polymers" (cf. J. W. Breitenbach, Chimia, Vol. 21, pp. 449-488, 1976). In the pharmacopoeias such as USP or Ph. Eur. these polymers are termed crospovidones. Polymers of this type have a porous structure and have many cavities. The polymers do not form gels even on absorption of water. The swelling volume of polymers of this type in water at 20° C. is usually in the range from 2 to 10 l/kg, preferably from 4 to 8 l/kg.

The preparation of popcorn polymers is known per se. The conduct of a polymerization process substantially determines whether it gives popcorn polymers rather than glassy polymers. EP-B 88964 describes by way of example processes suitable for the preparation of popcorn polymers as used for the purposes of the present invention.

The popcorn polymers are crosslinked polymers. The crosslinking can take place either physically or chemically. Suitable chemical crosslinking agents are generally compounds whose molecule comprises at least two ethylenically unsaturated non-conjugated double bonds, and which therefore act as difunctional crosslinking agents during the polymerization process. Examples of preferred representatives are alkylenebisacrylamides, such as methylenebisacrylamide and N,N'-acryloylethylenediamine, N,N'-divinylethyleneurea, N,N'-divinylpropyleneurea, ethylidenebis-3-(N-vinylpyrrolidone), N,N'-divinylimidazolyl(2,2')butane, and 1,1'-bis(3,3')vinylbenzimidazolin-2-one)-1,4-butane.

Examples of other suitable crosslinking agents are alkylene glycol di(meth)acrylates, such as ethylene glycol diacrylate, ethylene glycol dimethacrylate, tetraethylene glycol diacrylate, tetraethylene glycol dimethacrylate, diethylene glycol diacrylate, diethylene glycol dimethacrylate, aromatic divinyl compounds, such as divinylbenzene and divinyltoluene, and also vinyl acrylate, allyl acrylate, ally methacrylate, divinyldioxane, pentaerythritol triallyl ether, triallylamines and also mixtures of the crosslinking agents.

Particularly preferred crosslinking agents are ethylene glycol diacrylate, ethylene glycol dimethacrylate, N,N'-divinylethyleneurea (DVEH), and divinylbenzene (DVB).

The amounts used of the crosslinking agents are from 0 to 10% by weight, preferably from 1 to 8% by weight, particularly preferably from 0.2 to 5% by weight, based on the total amount of the polymer.

These crospovidones are available commercially, for example in the form of Divergan® grades, BASF, or Polyplasdone® grades, ISP.

The grain sizes of the popcorn polymers are generally from 15 µm to 1500 µm.

The quantitative proportions here are selected so that the filter aid comprises from 20 to 95% by weight, preferably from 50 to 85% by weight, particularly preferably from 60 to 75% by weight, of a polystyrene, and from 5 to 80% by weight, preferably from 15 to 50% by weight, particularly preferably from 40 to 25% by weight, of crosslinked water-insoluble polyvinylpyrrolidone.

In principle, the conventional types of extruder known to the person skilled in the art are suitable for the inventive process. These usually comprise a barrel, a drive unit, and also a plastifying unit composed of one or more rotating shafts (screws) provided with conveying elements or with kneading elements.

Along the screws in the direction of transport there are two or more sections which in the inventive process comprise a feed zone, a mixing zone, and a metering zone. There may also be devolatilizing zones provided, and the devolatilization here can take place at atmospheric pressure and/or in vacuo. By way of example, vacuum devolatilization can take place with the aid of a stuffing screw and of a steam-jet pump.

Each of these sections can in turn comprise one or more barrel sections as smallest independent unit.

The filter aids may be prepared in a single-screw extruder, in a twin-screw extruder, or in multiple screw extruders, but preferably in a twin-screw extruder. Two or more screws may be designed to corotate or counterrotate, with intermeshing or with close intermeshing, The preferred design of the extruder is corotating and closely intermeshing. The individual barrel sections are to be heatable. The barrel sections may also have been designed for cooling, for example for cooling by water.

The screws may be composed of any of the elements conventional in the extrusion process. They may comprise not only conventional conveying elements but also kneading disks or reverse-conveying elements. A person skilled in the art can use simple trials to determine which screw configuration is suitable in an individual case. The ratio of screw length to screw diameter (LD ratio) can be from 25:1 to 50:1, preferably from 30:1 to 40:1.

The extruder used according to the invention in essence divides into the following sections:

In a first section, the polystyrene is introduced into the extruder and melted. The screw geometry in this section corresponds to the conventional conditions for the conveying and melting of thermoplastic polymers. Following the barrel section provided with a feed apparatus there is/are from one to two barrel sections in which the polystyrene is melted. In this region, the screws may have not only conveying elements but also kneading disks.

In a second section, designed as a mixing zone, the crosslinked polyvinylpyrrolidone is introduced into the molten polystyrene. Prior to the addition, the molten polystyrene is preferably subjected to pre-deaeration or to devolatilization. The devolatilization/deaeration takes place at pressures of from 0.005 to 0.1 MPa, preferably at atmospheric pressure. The components are then intimately mixed so that the crosslinked polyvinylpyrrolidone, solid under the processing conditions, is homogeneously dispersed within the molten polystyrene. This section likewise comprises conventional conveying elements. In order to convey the mixture it can be advisable also to incorporate kneading disks. It can also be advisable to incorporate reverse-conveying elements for additional improvement of the mixing process. From one to three barrel sections are generally provided for this section.

Between this mixing zone and the third section there are retarding elements attached, these being intended to prevent steam from traveling back into the feed apparatus for the crosslinked polymer and blocking it.

In the third section, water is then introduced into the mixture of the polymeric components. The water may be added by way of conventional charging apparatus, for example by way of funnel-shaped charging apparatus, or with the aid of metering pumps. The composition comprising water is then conveyed further in the direction of the discharge orifice, with mixing of water and melt. This section can be composed of from one to three barrel sections, as a function of the amount of composition to be processed.

Between the third section in which water is introduced and the discharge orifice there may also be a vent zone provided with one or more barrel sections, and the devolatilization here may take place at atmospheric pressure and/or in vacuo. The devolatilization preferably takes place at pressures of from 0.005 to 0.1 MPa. Between the vent zone and the discharge orifice, there may be further barrel sections provided.

The composition, still plastic, is then discharged from the extruder. The method of discharge may use conventional die plates, pelletizing dies, or other suitable apparatus.

The feed zone for the polystyrene is usually not heated. All of the other zones are heated, as also are transition sections between extruder and die plate, and also the die plate itself, in order to ensure plasticity of the composition.

The barrel temperature of the extruder sections, the temperature of the transition piece, and that of the die plate, is usually from 180 to 220° C. The barrel temperature selected must always be such that the temperature of the composition is above the melting point of the polystyrene but below the decomposition temperature of the crosslinked polymer.

The mixture, still plastic, is preferably extruded through a die and comminuted. Comminution techniques suitable are in principle any of the conventional techniques known for this purpose, examples being hot-cut pelletizers and cold-cut pelletizers.

By way of example, the extrudate can be chopped by rotating knifes or by an air jet.

Another method of pelletizing the extrudate is water-cooled die-face pelletization.

The extrudate is then ground. The grinding can take place in one or more steps, preferably in two steps, thus setting the desired particle size. The particle sizes set may be from 20 to 100 µm. The grinding may take place after preliminary comminution (1st grinding step) in any commercially available rotor-based mill, preferably in a counterrotating pinned-disk mill, with cooling of the product by liquid nitrogen or by any other commercially available cooling medium, e.g. dry ice, to a temperature of from −50° C. to +5° C., and, in a 2nd grinding step, in any commercially available opposed-jet mill. For the second grinding process, the preferred suitable process is low-temperature grinding. In this, an inert gas at low temperature is introduced into the composition to be ground. An example of a grinding gas that can be used is nitrogen or argon. The grinding gas is preferably cooled to temperatures of from −50 to +5° C.

If desired, the extrudate can also be dried before grinding.

The average particle size of the filter aids after the 1st grinding step is from 45 to 100 μm, preferably from 45 to 75 μm.

The preferred average particle sizes of the filter aids after the second grinding process are from 20 to 40 μm.

The average particle size is determined by taking the cumulative weight distribution.

If desired, the filter aids may also then be subjected to a process for lowering the residue styrene monomer content. This can take place by mixing the particulate blend with water, subjecting the mixture to a steam distillation process, and then isolating the particulate blend, or by directly drawing off the water from the mixture composed of particulate blend and water in a vessel equipped with an apparatus for moving the composition, for example in a paddle dryer.

For the use as filter aid, it is possible to use either ground extrudates with a single average particle size or else mixtures of ground fractions with different average particle size. By way of example, it is possible to use a mixture composed of ground extrudate from the first grinding step and of ground extrudate from the second grinding step. The quantitative proportions of these mixtures can be freely selected and usually depend on the nature of the product to be filtered. By way of example, it is possible to use mixtures composed of a grinding product of the first grinding step with grinding product of the second grinding step with quantitative proportions of from 5:95 to 95.5, from 20:80 to 80:20, from 30:70 to 70:30, from 40:60 to 60:40, or 50:50. However, it is also possible to use grinding products of the second grinding step alone with average particle sizes of from 20 to 40 μm. It is also possible to use the grinding products of the first grinding step alone with average particle sizes of from 45 to 100 μm.

Surprisingly, the inventive process can easily produce pellets which can be adjusted via grinding, without increased energy cost, to the desired particle sizes.

It was also surprising that, despite the introduction of water, no demixing of the blend occurred and the morphology was unaffected.

The person skilled in the art would have expected that the property possessed by the popcorn polymers of sometimes developing a high swelling pressure in contact with water would hinder incorporation into the polystyrene matrix and instead would lead to phase separation of the two components. Even during the grinding process, no demixing of the components was observed.

EXAMPLES

The experiments carried out in the examples below were carried out with the aid of a corotating, closely intermeshing ZSK40 twin-screw kneader from Werner & Pfleiderer, provided with a pelletizing die at the extruder outlet.

Extruder Structure:

9 sections (zones 0 to 8), heated transition flange (zone 9), die plate (zone 10). Between zone 5 and zone 6, the screws had a retarding element. The L/D ratio was 37.

The temperature profile selected was as follows for all of the experiments, the temperature stated always being the barrel temperature:

Zone 0: RT; zone 2: 200° C., zones 3-5: 180° C.; zone 6: 185° C.; zones 7-9: 190° C.; die plate: 210° C.

The screw rotation rate was 200 rpm.

The emerging extrudate was shaped via water-cooled die-face pelletization.

The material used according to examples 1, 4, 5, and 6 was obtained via extrusion of 70% by weight of polystyrene 158 K and 30% by weight of crospovidone. The material according to examples 2 and 3 was obtained using polystyrene 486 M with the same proportions by weight.

Grinding:

The particle size was measured by means of a Malvern Insitec laser diffraction spectrometer, using dry dispersion of the product and a pressure of 0.3 MPa. X50: average particle size, cumulative weight distribution.

Grinding of Material According to Examples 1 to 5

First step: the extrudate was comminuted in a Pallmann PP L18 counterrotating pinned-disk mill using pin inserts with a main rotor rotation rate of 10 000 rpm and a counterrotor rotation rate of 3300 rpm, and throughput of 10 kg/h. The extrudate was cooled with liquid nitrogen in a cooling screw. The mill input temperature was −20° C.

Second step: this took place in a Hosokawa Alpine AFG 200 fluidized-bed opposed-jet mill. The grinding gas used comprised nitrogen precooled to from −5 to +5° C. with a grinding pressure of 0.8 MPa. The mill was equipped with three grinding nozzles, diameter 4 mm. The classifier wheel used comprised the standard ATP 100 steel lamellae wheel from Hosokawa-Alpine, the classifier wheel rate being 3500 rpm. The pellets compounded according to the invention were at room temperature when added to the mill by way of a metering screw and a double-flap airlock valve, and thus ground to the stated grain size.

Grinding of the Material According to Example 6

First step: the extrudate was comminuted in a Hosokawa Alpine Contraplex 250 CW counterrotating pinned-disk mill, the rotor rotation rate being 11 200 rpm on the housing side and 5200 rpm on the door side, with a throughput of 90 kg/h. The extrudate was cooled in a cooling screw with liquid nitrogen. The mill output temperature was −20° C.

Second step: this took place in a Hosokawa Alpine AFG 400 fluidized-bed opposed-jet mill. The grinding gas used comprised nitrogen precooked to +5° C. with a grinding pressure of 0.8 MPa. The mill was equipped with three grinding nozzles, diameter 8 mm. The classifier wheel used comprised the standard ATP 200 steel lamellae wheel from Hosokawa-Alpine, the classifier wheel rate being 2450 rpm. The pellets compounded according to the invention were at room temperature when added to the mill by way of a metering screw and a double-lap airlock valve, and thus ground to the stated grain size.

| Example No. | Amount of water during extrusion [% by weight] | X50 1st grinding [μm] | X50 2nd grinding [μM]] | Throughput 2nd grinding [kg/h] |
|---|---|---|---|---|
| 1 | 1.5 | 98 | 31 | 3.5 |
| 2 | 0.75 | 60 | 32 | 3 |

-continued

| | | | | |
|---|---|---|---|---|
| 3 | 1.5 | 68 | 32 | 4 |
| 4 | 0.5 | 97 | 33 | 5.3 |
| 5 | 1.5 | 78 | 29 | 5 |

| Example No. | Amount of water during extrusion [% by weight] | X50 1st grinding [μM] | Throughput 1st grinding kg/h | X50 2nd grinding [μm] | Throughput 2nd grinding kg/h |
|---|---|---|---|---|---|
| 6 | 0.5 | 51 | 90 | 27 | 33 |

Applications Examples

Filtration of Unfiltered Beer

The filtration process was carried out using material according to example 6, using a mixture composed of 60% by weight of a fraction from the 1st grinding step (X50: 51 μm) and 40% by weight of a fraction of the 2nd grinding step (X50: 27 μm).

The filtration action was determined on unfiltered beer. The study carried out was a precoat filtration process by means of a pilot candle filter (gap width 70 μm, filter area 0.032 m$^2$, throughput 15 l/h). The filtrate was regarded as clear if the EBC value is less than 1. The flow rate was also measured. The filtration action provided by the material was found to be just as good as that of kieselguhr.

| Specimen | Material according to ex. No. 4 | Regenerated material according to ex. No. 4 | For comparison: kieselgur |
|---|---|---|---|
| Haze prior to filtration | 7 EBC | 7 EBC | 7 EBC |
| Haze after flow volume of | | | |
| 30 l (2 hours) | 0.9 EBC | 0.6 EBC | 0.7 EBC |
| 60 l (4 hours) | 0.9 EBC | 0.6 EBC | 0.7 EBC |
| 90 l (6 hours) | 0.9 EBC | | 0.7 EBC |
| Flow rate | 15 l/h | 15 l/h | 15 l/h |

The invention claimed is:

1. A process for production of polymer blends and which comprises melting a polystyrene in an extruder and then mixing said melted polystyrene with a polyvinylpyrrolidone to form a mixture, and adding, to the mixture, from 0.1 to 10% by weight of water, and extruding and comminuting the mixture and the extruder has a barrel temperature of from 180 to 220° C.

2. The process of claim 1, wherein the polymer blend comprises from 20 to 95% by weight of polystyrene and from 5 to 80% by weight of polyvinylpyrrolidone.

3. The process of claim 1, wherein the polymer blend comprises from 50 to 85% by weight of polystyrene and from 15 to 50% by weight of polyvinylpyrrolidone.

4. The process of claim 1, wherein the polymer blend comprises from 60 to 75% by weight of polystyrene and from 25 to 40% by weight of polyvinylpyrrolidone.

5. The process of claim 1, wherein the amount of the water added during the extrusion process is from 0.5 to 5% by weight.

6. The process of claim 1, wherein the polystyrene melt is devolatilized prior to addition of the polyvinylpyrrolidone.

7. The process of claim 1, wherein the emerging extrudate is shaped via water-cooled die-face pelletization.

8. The process of claim 7, wherein the extrudate is adjusted via grinding to the desired particle size.

9. The process of claim 8, wherein the grinding takes place in one or more steps.

10. The process of claim 8, wherein average particle sizes of from 45 to 100 μm are obtained.

11. The process of claim 8, wherein average particle sizes of from 20 to 40 μm are obtained.

12. The process of claim 8, wherein the desired particle size is set via low-temperature grinding.

13. A filter aid which comprises the polymer blend produced by the process which comprises melting a polystyrene in an extruder and then mixing said melted polystyrene with a polyvinylpyrrolidone to form a mixture, and adding, to the mixture, from 0.1 to 10% by weight of water and extruding and comminuting the mixture and the extruder has a barrel temperature of from 180 to 220° C.

14. The filter aid as claimed in claim 13, wherein a mixture of ground polymer blends with different average particle size is used.

15. The filter aid as claimed in claim 13, wherein a ground polymer blend with single average particle size is used.

16. A process for treating drinks which comprises filtering a liquid with a filter wherein the filter comprises the filter aid as claimed in claim 13.

17. The process as claimed in claim 16, wherein the drink is a beer.

18. The process as claimed in claim 16, wherein the drink is a wine.

19. The process as claimed in claim 16, wherein the drink is a fruit juice.

20. A process for production of polymer blends and which comprises melting a polystyrene in an extruder and then mixing said melted polystyrene with a polyvinylpyrrolidone to form a mixture, and adding, to the mixture, from 0.1 to 10% by weight of water, and extruding and comminuting the mixture and the extruder has a barrel temperature of from 180 to 220° C. and wherein the extrudate is adjusted via grinding to the desired particle size.

21. The process of claim 20, wherein the polymer blend comprises from 60 to 75% by weight of polystyrene and from 25 to 40% by weight of polyvinylpyrrolidone.

22. The process of claim 20, wherein the amount of the water added during the extrusion process is from 0.5 to 5% by weight.

23. The process of claim 20, wherein the polystyrene melt is devolatilized prior to addition of the polyvinylpyrrolidone.

24. A filter aid which comprises the polymer blend produced by the process as claimed in claim 20.

* * * * *